United States Patent

Berner

[11] Patent Number: 4,949,978
[45] Date of Patent: Aug. 21, 1990

[54] MAGNIFYING DEVICE

[76] Inventor: David Berner, 27 Conway Dr., Middletown, Pa. 17057

[21] Appl. No.: 275,954

[22] Filed: Nov. 25, 1988

[51] Int. Cl.⁵ .................. A63F 3/06; G02B 27/02; G02B 3/00
[52] U.S. Cl. .................... 273/288; 273/269; 273/DIG. 14; 273/DIG. 16; 350/410; 350/432; 350/436; 350/114; D16/135; D21/53
[58] Field of Search ............ 273/288, 269, 291, 94 R, 273/DIG. 14, DIG. 16; 350/432, 436, 413, 114–116, 409, 410; D16/134, 135; D21/51, 52, 53; 128/303 R; D19/96

[56] References Cited

U.S. PATENT DOCUMENTS

| | | | |
|---|---|---|---|
| 1,821,623 | 9/1931 | Emmerich | 350/432 |
| 2,096,524 | 10/1937 | Martin | 350/432 |
| 2,151,573 | 3/1939 | Stanley | 350/410 |
| 2,358,092 | 9/1944 | Luboshez | 350/409 |
| 2,375,634 | 5/1945 | Dunning | 350/432 |
| 2,867,152 | 1/1959 | Boolsky-Bogopolsky | 350/410 |
| 3,414,263 | 12/1968 | Buchsieb | 273/94 R |
| 3,416,867 | 12/1968 | Biber | 350/436 |
| 3,480,278 | 11/1969 | Conley | 278/288 |
| 3,497,687 | 2/1970 | Hermann | 350/436 |
| 3,731,988 | 5/1973 | Lynch | 350/410 |
| 3,867,018 | 2/1975 | Shoemaker | 350/410 |
| 4,012,127 | 3/1977 | Bolander | 350/114 |
| 4,053,953 | 10/1977 | Flom et al. | 128/303 R |
| 4,183,624 | 1/1980 | Rogers et al. | 350/410 |
| 4,427,198 | 1/1984 | LaRue | 273/288 |

FOREIGN PATENT DOCUMENTS

| | | | |
|---|---|---|---|
| 905405 | 4/1945 | France | 350/410 |
| 815701 | 3/1981 | U.S.S.R. | 350/410 |
| 421620 | 12/1934 | United Kingdom | 350/409 |
| 440996 | 1/1936 | United Kingdom | 350/432 |

Primary Examiner—Benjamin Layno

[57] ABSTRACT

A magnifying device for use with certain games and for reading small print. More particularly, the device has non-parallel, spaced apart lower and upper surfaces such that when the device is placed on a flat surface, the upper surface is at an oblique angle to the viewer so that an underlying number or word is magnified and more clearly seen. The device may also serve as a bingo marker and magnifier for magnifying the given number over which the marker lays.

4 Claims, 1 Drawing Sheet

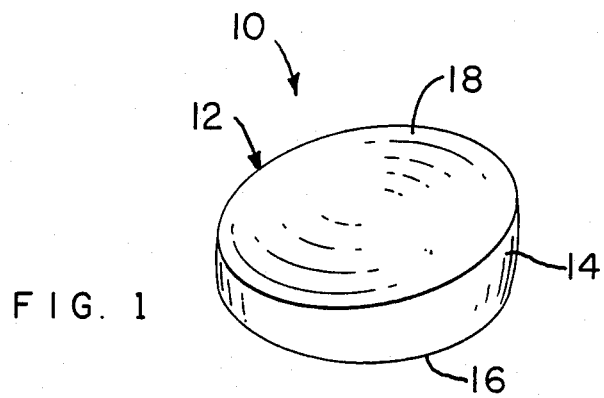
FIG. 1
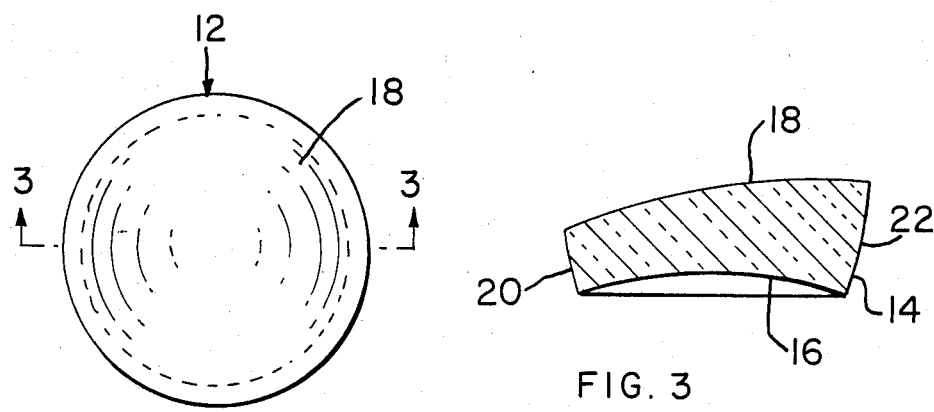
FIG. 2
FIG. 3
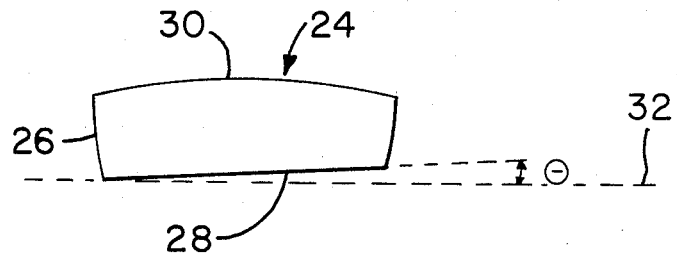
FIG. 4

MAGNIFYING DEVICE

FIELD OF THE INVENTION

The present invention relates to a device which may be used as a magnifying marker in certain board games and further as an aide in reading small print.

BACKGROUND OF THE INVENTION

Certain board games have closely adjacent rows of spaces in various array of patterns, e.g, the game of bingo, and wherein each space contains a letter or number. In these types of games, the objects include moving a game piece in some given direction or, as in the case of bingo, to placing game pieces on each number as such is called out to complete a horizontal, vertical or diagonal row, or some other prescribed pattern.

In the case of the game of bingo, a player, particularly one playing a number of cards simultaneously, may wish to highlight a single number on the card or cards which, when called or selected by the bingo caller, will complete the required predetermined pattern. It is known from U.S. Pat. No. 4,427,198 to LaRue to employer a marker similar to ordinary markers used in the game but having a greater thickness and further being capable of obliquely projecting the image of the particular number to the user on which the marker is placed.

Although these known markers are generally useful, people playing in poorly lighted bingo halls or who have diminished eyesight are prevented from enjoying the benefits thereof. For example, the increased thickness of the known marker may be overlooked when surrounded by many markers of ordinary thickness. Accordingly, it is now proposed to provide a device having properties which will overcome these and other problems.

SUMMARY OF THE INVENTION

According to the invention, a device is provided having lower and upper spaced apart, opposing surfaces, with the upper surface being at an angle relative to the lower surface so that when the device is placed on a flat surface, as on a game card, with the lower surface on the card, the upper surface is disposed at an angle to a viewer.

BRIEF DESCRIPTION OF THE DRAWINGS

FIG. 1 is a perspective view of a device constructed in accordance with one embodiment of the invention;

FIG. 2 is a top plan view of the device of FIG. 1;

FIG. 3 is a side elevational view of the device taken along lines 3—3 of FIGS. 1 and 2; and FIG. 4 is a side elevational view of another embodiment of the device.

DESCRIPTION OF THE INVENTION

As shown in FIGS. 1-3, device 10 consists of a solid preform 12 having sides or periphery 14, lower surface 16 and upper surface 18. Periphery 14 is shown as extending obliquely outwardly from lower surface 16 to provide upper surface 18 with a larger perimeter; i.e., a larger viewing surface area. Thus, device 10 can be placed on a smaller space without decreasing the visibility thereof. Preform 12 may also be made with periphery 14 being normal to surfaces 16,18.

As shown in FIG. 3, lower surface 16 is concave and upper surface 18 is convex. This concavo-convex shape is predetermined to provide preform 12 with a refractive power of 13 diopters. Accordingly, device 10 possesses a magnification power which enables the user in poor light or with diminished eyesight to see the underlying number or words larger and more clearly. This capability thus provides an additional use for device 10; e.g., to be able to read small numbers and words in a telephone directory, on maps and the like.

The thickness of preform 12 uniformly increases thereacross, as shown in FIG. 3, from point 20 to point 22 so that upper surface 18 is at a slant or angle relative to lower surface 16. This feature permits a user to more readily see a number or the like on which device 10 is resting from an angle. Alternatively, the thickness of preform 12 can be uniform. In this case, the convexity of upper surface 18 would be increased to provide the same result.

FIG. 4 illustrates preform 24 which includes periphery 26, lower surface 28 and upper surface 30. Lower surface 28 is cut so that it is at an angle of two diopters relative to a level surface indicted by dashed line 32.

Upper surface 30 is convex and periphery 26 extends obliquely outwardly from lower surface 28 to upper surface 30. However, periphery 26 may be formed at right angles relative to surface 32, if desired, without effecting the capabilities of preform 24.

The preferred use is to place device 10 so that the thicker side, point 22, is towards the viewer to reduce unwanted reflection.

Preferably, preform 12 is made from a transparent plastic, such as acrylic, by injection molding. The molds should have highly polished surfaces for optical clarity. A preferred size is one wherein the greatest thickness would be about 0.375 inches, the diameter of lower surface 16 would be about 0.875 inches and the diameter of upper surface 16 would be about 1.000 inch.

As can be discerned, a marking device has been disclosed in which an upper surface is formed at an angle relative to the lower surface so as to enable a user to read a number, word or mark thereunder from an angle. Further, the periphery of the device extends obliquely outwardly from the lower surface to provide the upper surface with a larger perimeter. Also, the lower and upper surfaces are respectively concave and convex to provide the device with a predetermined refractive power.

We claim:

1. A device for use for use on flat surface having indicia and adapted to provide a user with an enlargement of the indicia, said device comprising a preform made from a transparent material and having a flat lower surface adapted to receive the flat surface, a convex upper surface and sides therebetween which are tapered outwardly from said lower surface to said upper surface so that the periphery of said upper surface is greater than the periphery of said lower surface for providing a viewing surface area larger than said lower surface, the length of said sides are not uniform so that the plane of said upper surface is at an angle relative to said lower surface for providing an image, at an oblique angle to the user, of an indicia over which the preform lays.

2. The device according to claim 1 wherein the curvature of said upper surface is defined by a simple radius.

3. A device for use in playing bingo games and for providing the player with an enlargement of a given number on a bingo card, said device comprising a preform made from a transparent acrylic material and having a flat lower surface adapted to receive the bingo card, a convexly-shaped upper surface and sides extending obliquely outwardly from said lower surface to said upper surface for providing a viewing surface area larger than said lower surface, the plane of said upper surface is at an angle relative to said lower surface for providing an image at an oblique angle to the player of the given number over which the preform lays.

4. The device according to claim 3 wherein the curvature of said upper surface is defined by a simple radius.

* * * * *